United States Patent [19]
Kirkland

[11] Patent Number: 5,019,822
[45] Date of Patent: May 28, 1991

[54] MARINE OBJECT DETECTOR

[75] Inventor: James L. Kirkland, Panama City, Fla.

[73] Assignee: The United States of America as represented by the Secretary of the Navy, Washington, D.C.

[21] Appl. No.: 379,513

[22] Filed: Jul. 9, 1973

[51] Int. Cl.$^5$ ............... G01S 13/00; H04B 13/02; G01V 3/08
[52] U.S. Cl. ..................... 342/22; 342/27; 340/850; 324/326
[58] Field of Search ............ 340/4 R, 4 E, 850; 324/62 R, 326; 342/22, 27

[56] References Cited

U.S. PATENT DOCUMENTS

| | | | |
|---|---|---|---|
| 3,214,728 | 10/1965 | Higgins | 340/4 R |
| 3,329,929 | 7/1967 | Burnett | 340/4 E |
| 3,412,371 | 11/1968 | Shostak | 340/4 R |
| 3,719,947 | 3/1973 | Gutton et al. | 340/4 R |

Primary Examiner—Gregory C. Issing
Attorney, Agent, or Firm—Sol Sheinbein

[57] ABSTRACT

A system is disclosed for detecting and locating the occurrence of anomalies to radio frequency electromagnetic transmission in conductive liquids. Applications are described for use in swimmer detection and for process monitoring.

4 Claims, 2 Drawing Sheets

MARINE OBJECT DETECTOR

STATEMENT OF GOVERNMENT INTEREST

The invention described herein may be manufactured and used by or for the Government of the United States of America for Governmental purposes without the payment of any royalties thereon or therefor.

FIELD OF THE INVENTION

This invention relates to detection of the presence of anomalies in a conductive fluid media, and more particularly to the use of radio frequency electromagnetic wave propagation in such detection. Fluid media and anomalies of the types to which the invention pertains may include, for example, sea water as the conductive fluid medium in which a swimmer is an anomaly producing foreign substance. In the instance of protection of bridges, piers, etc., of military importance, from being destroyed by explosive charges deposited by enemy swimmers, the invention provides a means for detecting the presence of the swimmers so that defensive measures can be taken. Other media and anomalies may include, for example, industrial liquids in conduits wherein the anomaly may result from a different liquid, a gas, or a solid, separating two liquids or quantities of liquid.

DESCRIPTION OF THE PRIOR ART

Detection of swimmers immersed in water has posed a considerable problem, particularly where the detection apparatus must be sufficiently economical and reliable to permit coverage of extensive areas around bridges, piers, and the like, on a full time basis. Radar is only effective if a swimmer is on the surface, while the effectiveness of active sonar is limited by its high initial and maintenance costs per unit, and the fact that its limited range would require the installation of many expensive units.

Moreover, it is desirable that swimmer detection systems can function to provide indications at remote monitoring stations of the occurrence of a swimmer's intrusion, and that the swimmer be unaware of the fact that he is under surveillance, or in a monitored area. Active sonar systems necessarily put acoustic energy into the water, which energy can, with suitable accessories, be sensed by the swimmers, giving them warning that extra precautions must be taken to accomplish their objectives.

It has been proposed heretofor to utilize amplitude changes in radio frequency electromagnetic transmission through water to detect the presence of swimmers. Such a system, while relatively modest in cost, requires detection of very small amplitude changes and is subject to false alarms and failures of detection due to background noise, spurious signals, and the like.

Other object detection systems have been proposed such as by detection of magnetic anomalies (U.S. Pat. No. 3,425,032), or by transmission of alternating current through water and detecting potential changes (U.S. Pat. No. 3,329,929). The former is of no significant effect where the object to be detected is of nonmagnetic character, and the latter requires electrical power to be injected into the water at frequencies that would make appropriately equipped swimmers aware of surveillance.

SUMMARY OF THE INVENTION

The present invention aims to overcome most or all of the disadvantages of the prior art through the provision of an anomaly detection system that detects phase differences in the transmission of radio signals through a conductive liquid media when the media contains an anomaly producing object, as compared to when it does not.

With the foregoing in mind, it is a principal object of this invention to provide an improved apparatus or system for detecting an anomaly in radio transmission through a conductive liquid as an indication of the presence of a foreign object or substance therein.

Another object of the invention is the detection of radio transmission anomalies in an aqueous medium by comparison of the phases of radio frequency signals received at one location via different paths, changes in phase relation being indicative of a transmission anomaly and presence of a foreign body or substance causing the anomaly.

Still another object is the provision of an improved apparatus for the detection of swimmers in locations around structures such as bridges, piers, and the like, which apparatus can function on the radio frequency electromagnetic emanations either from special transmitters for that purpose, or from existing broadcasting transmitters.

Yet another object is the provision of apparatus of the foregoing character which is relatively inexpensive, can be disposed in such configurations as to permit ready identification of the zone or location of the intruder, and does not effect introduction of energy into the water in any manner that would provide an intruder with a warning that he is in an area that is under surveillance.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
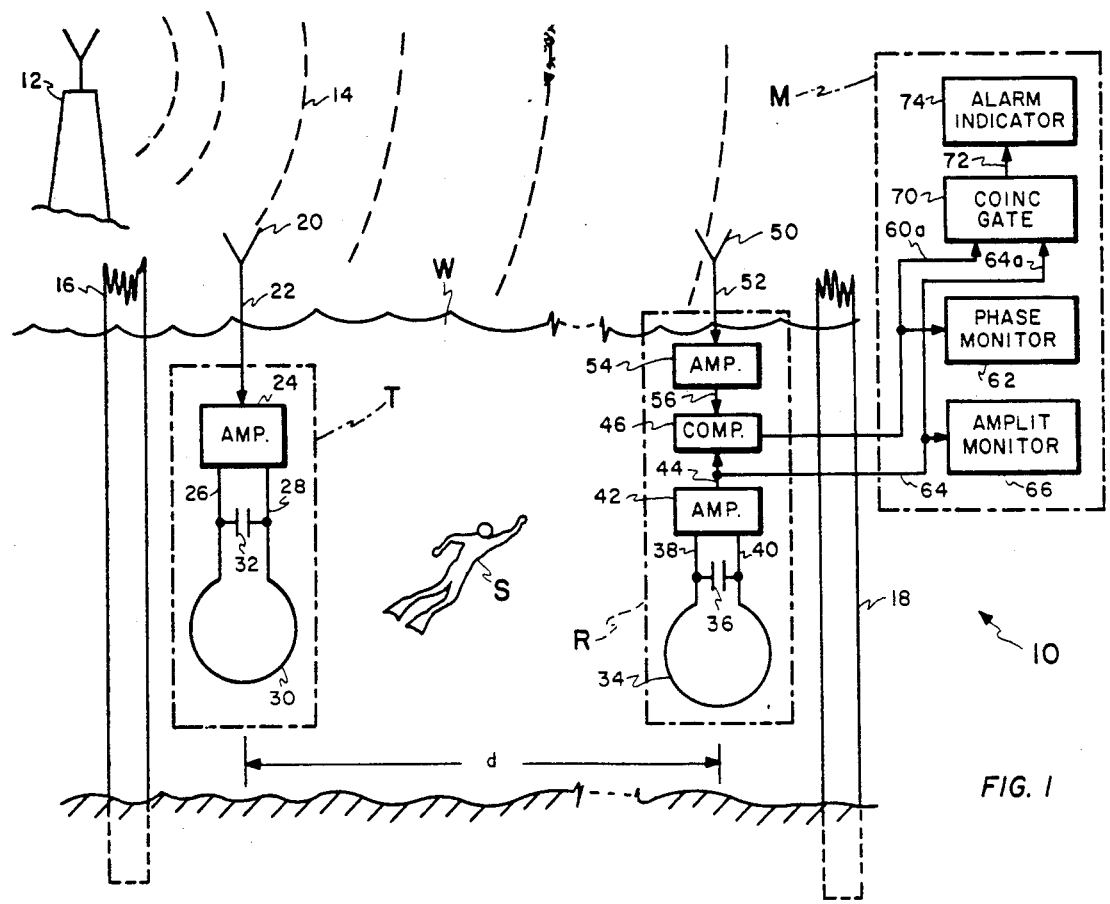
FIG. 1 is a diagrammatic illustration of a swimmer detecting system embodying the invention.

In the form of the invention illustrated in FIG. 1, there is provided a swimmer detecting system 10 of a type suitable for use in monitoring the waters around bridges, piers, and such other structures as it may be militarily desirable to protect. System 10 comprises a source of electromagnetic signals having a characteristic that changes at a predetermined frequency in the radio frequency range. In this example, that source may comprise a amplitude modulation radio transmitter 12 that emanates radio waves at a determinable carrier frequency, say 1000 KHz. These radio waves 14 are propagated through air space over the water W between pilings 16 and 18 of the structure sought to be protected. Pilings 16 and 18 are merely representative of structural elements, it being understood that other elements such as bridge abutments, break waters, navigational markers, and the like, may be considered their equivalent. Indeed, the pilings or other structural elements form no part of the invention per se, but are illustrative of the type of surroundings in which the invention may be used, and may serve as a structural support for components of the system being described.

Transmitter 12, as the source of radio waves 14 is electromagnetically coupled via a receiving antenna 20, a conductor 22, a linear amplifier 24, and conductors 26 and 28 to an electromagnetic energy radiating antenna 30 disposed in the water W. Amplifier 24 and antenna 30 may be regarded as a transmitter T. Antenna 30 is illustrated in FIG. 1 as being of the loop type, resonantly tuned by a capacitor 32, although it will be understood that other forms of antenna, such as a dipole, may be used to advantage in some installations.

A similar antenna 34, forming part of a receiver R, is disposed in the water W adjacent piling 18 for the purpose of receiving electromagnetic energy through water W from antenna 30. Antenna 34, likewise conveniently tuned by a capacitor 36, is connected by conductors 38 and 40 to the input of a linear amplifier 42. Antenna 34 is coupled by amplifier 42, as indicated by flow line 44 to one input connection of a phase comparator 46. Phase comparator 46 has its other input coupled to transmitter 12 by an antenna 50, conductor 52, a linear amplifier 54, and line 56.

Antennas 30 and 34 are spaced a predetermined distance d from each other, with the water space therebetween being that zone in which an anomaly may be detected.

The output of comparator 56, represented by a line 60, is applied to utilization means such as an indicating phase monitor 62. Monitor 62 may be disposed at a remote monitoring location M along with other similar phase difference indicating monitors from other systems identical to system 10.

A further output signal may be derived from amplifier 42 via line 64. This signal is representative of amplitude of the signal received by antenna 34 and may be implied to a suitable amplitude indicating monitor 66 at the same remote location as monitor 62.

In order to reduce susceptibility of the system to a false alarm or detection, the system 10 may comprise as a criteria for a positive indication of an anomaly, that an anomaly representative signal be simultaneously occurring on each of lines 60 and 64. To this end, system 10 may include coincidence gate means 70 having as inputs the signals from comparator 46 and amplifier 42, respectively, via lines 60a and 64a. Coincidence of predetermined signal conditions on lines 60a and 64a cause gate means 70 to provide an output signal on line 72 to an alarm/indicator means 74.

MODE OF OPERATION

Consider that transmitter 12 is operating to provide radio waves 14 of a predetermined frequency, which waves travel through air space to the antennas 20 and 50. Electrical signals are thereby induced in antenna 20 and applied via line 22 to amplifier 24. Amplifier 24 increases the electrical signal strength and applies it to antenna 30. The radio frequency A.C. signal thereby applied to antenna 30 results in insertion of electromagnetic radio frequency energy into the water medium W, which energy travels in wave form through the water at a propagation rate which is substantially different than that in air. The wave lengths of the radio frequency energy in the water, and the rate of propagation thereof therethrough will be described more fully as the description proceeds with reference to design factors to be considered in constructing a practical system 10. Suffice it to say for now that the wave lengths are substantially diminished, and the rate of propagation substantially decreased in the water medium. As will also be explained hereinafter, the radio wave energy is more rapidly attenuated in water than in air, however the distance d is calculated so that sufficient energy will reach antenna 34 to induce therein an electrical signal corresponding in frequency to that of transmitter 12.

Because of the decreased rate of propagation and reduction of wave lengths of the radio frequency electrical energy traveling through the water as compared to that traveling through air, there will be a substantial change in phase relation between the energy in the water and that in air over the distance d between antennas 30 and 34, and over the distance between antennas 20 and 50 which is for practical purposes substantially the same as distance d.

The signal received by antenna 34 is amplified by amplifier 42 and applied as the first input to phase comparator 46. Similarly, signals received through the air by antenna 50 are applied as shown by flow line 52 to amplifier 54 and amplified to be applied as the second input to phase comparator 46. The output of phase comparator 46 is applied via line 60 to a phase monitor 62 which may comprise, for example, a cathode ray tube oscilloscope that will display the phase relationship between the air transmitted and water transmitted radio frequency signals in the form of a Lissajous figure in a manner which is well known to those skilled in the art to which the invention pertains. Because all of the parameters described thus far are constant, it will be recognized that the Lissajous figure will assume a correspondingly constant shape.

Now, however, if a foreign object such as a swimmer S enters the water path between antennas 30 and 34, an anomaly will be introduced in the radio frequency energy transmission capabilities of the conductive water between those antennas. The anomaly will produce a difference in the previously existing phase relationships and a resultant change in the Lissajous figure, or other display of monitor 62. The anomaly may be due in part to the fact that the foreign body constitutes a better or poorer transmitter of the radio frequency electromagnetic energy than the water that it displaces. In the case of it being a better conductor, the radio frequency energy arriving at antenna 34 will experience a phase shift in one direction, and in the event the foreign object constitutes a poorer transmitter a phase shift would be experienced in the opposite direction. In any event actual tests have shown that a phase change does occur under the circumstances described above, and that a rather definite indication of the presence of an anomaly, induced by presence of a foreign body, will result. Of course, in the instance where phase monitor 62 constitutes a cathode ray tube oscilloscope, the Lissajous figure will change its shape from the stable shape mentioned earlier and thereby provide a ready visual indication of a change in circumstances between antennas 30 and 34.

It will be appreciated that radio program material, such as music or the like, that is broadcast into the air by transmitter 12, will be rebroadcast into the water by transmitter T as it is received at antenna 20. Accordingly, a radio receiver, carried by an intruding swimmer and tuned to receive the transmissions of transmitter 12, will also receive the transmissions from transmitter T. However, because the latter transmissions constitute the same program material, the swimmer will not be alerted to the difference in sources.

In addition to the experiencing of a phase change of the energy transmitted through water W, it has been demonstrated that there will be an accompanying change in energy strength when a foreign body is introduced such as swimmer S, which change in energy or signal strength may be monitored by amplitude monitor 66. In the event it is desired to rely on a combination of phase and amplitude changes, in order to reduce the false alarm rate, a signal may be derived by coincidence means 70 to actuate alarm/indicator 74 when there is a concurrence of a predetermined phase change and a predetermined amplitude change.

Figure 2:
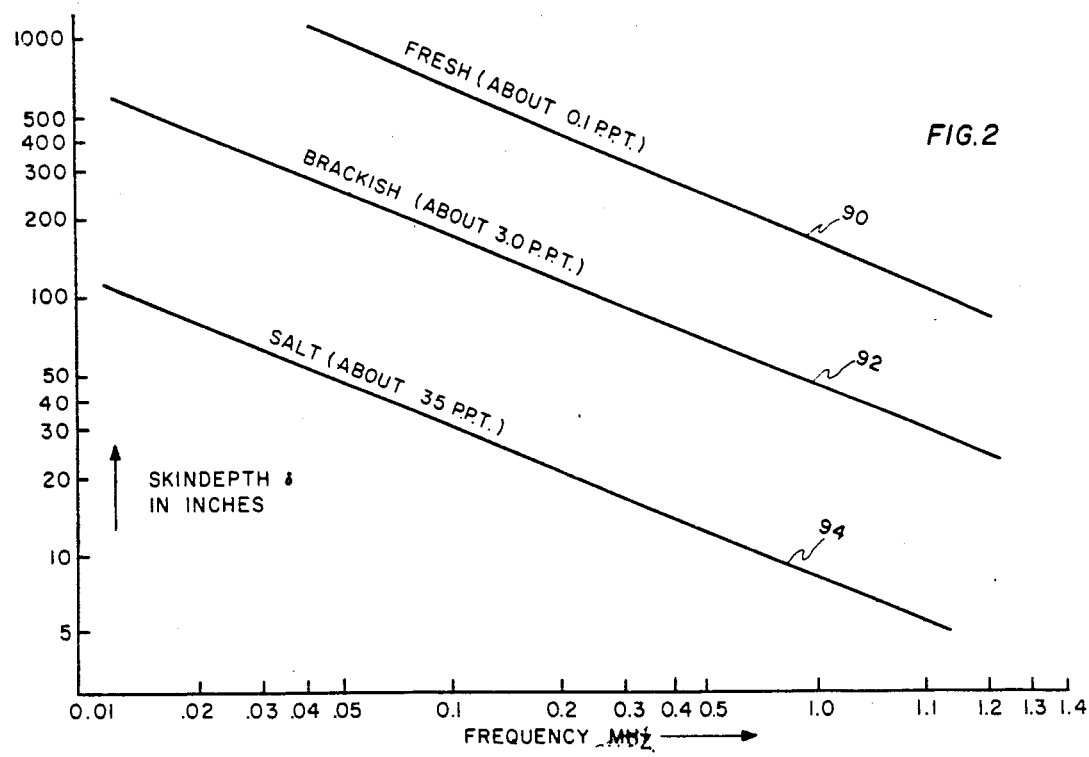
FIG. 2 is a graphic illustration of relationships between frequency and skindepth in aqueous media.

Certain design considerations will now be described as being helpful to an understanding of the operation of the invention and its application. These considerations have to do primarily with the propagation of radio frequency electromagnetic energy through aqueous media such as found in fresh water lakes and streams, brackish bays and estuaries, and salt water as found in oceans and their connecting areas. Referring to FIG. 2, there is graphically illustrated the relationship between frequency of the energy of transmission, and the ability of such energy to penetrate through water categorized as fresh, brackish, and salt. The ability of the media to transmit such electromagnetic energy, or conversely to attenuate such energy, is expressed in terms of skin depth $\delta$ where one skin depth is defined as that water depth which attenuates a signal to 1/e of its former value, or by about 8.7 db.

The skin depth $\delta$ characteristic of a particular conductive media is dependent upon the conductivity of the medium and the frequency of the energy being transmitted. Thus skin depth $\delta$ may be expressed as the equation $\delta = 20 \sqrt{\rho f}$ inches where $\rho$ equals conductivity in mhos per meter and f equals frequency in megahertz. In FIG. 2 then, a plot of skin depth versus frequency for fresh water having a salt content of about 0.1 parts per thousand, and a conductivity of 0.015 mhos per meter, is represented by line or curve 90. Brackish water of about 3.0 parts per thousand and conductivity of 0.2 mhos per meter is represented by curve 92. Similarly, salt water having about 35 parts per thousand and a conductivity of about 5 mhos per meter is represented by curve 94.

Assume, for example, an installation of the type illustrated in FIG. 1, wherein the aqueous medium W is brackish water represented by curve 92 of FIG. 2, and the distance d between pilings and the associated antennas 30 and 34 is nominally 10 feet. At a transmitter frequency of 1 megahertz, the brackish water W will have a skin depth $\delta$ of 45 inches (from FIG. 2). Accordingly, the spacing d is equal to approximately 2.66 skin depths, and signal attenuation between antennas 30 and 34 due to the aqueous medium W therebetween will be approximately 23 db.

In addition to attenuation of the signal between antennas 30 and 34, the transmission of electromagnetic energy at radio frequencies by a conductive medium, such as the brackish water under consideration, is characterized by a shorter wavelength than when transmitted through air space. The wavelength $\lambda$ in a conductive medium may be expressed $\lambda = 2\pi\delta$. In the present example, then, $\lambda = 2\pi \times 45$ inches or approximately 283 inches.

The spacing d (assuming 10 feet) between pilings 16 and 18 and the associated antennas 30 and 34, respectively, therefore represent approximately 153° of phase of the transmitted signal through water W.

Now, if a foreign body is introduced into the water W between antennas 30 and 34 that has radio wave propagation characteristics approaching that of air, an anomaly will be introduced into the path of transmission between antennas 30 and 34. If such a foreign body were to have an effective length of a few feet disposed in alignment with the path between antennas 30 and 34, the effective length of that path would be reduced by approximately two feet or 0.53 skin depth, thereby resulting in a decrease of attenuation on the order of 4.6 db, and a change in phase of the signal received at antenna 34 of approximately 31°. These changes, and particularly the phase change, are readily detectable by well known amplitude and phase monitoring devices represented by amplitude monitor 66 and phase monitor 62. The extent of the phase difference and the amplitude attenuation difference will, of course, be dependent upon a number of factors including the electrical conductivity of the anomaly producing foreign body, the size of the body, and the shape thereof. Additionally, the configuration and placement, or directional disposition, of the object will have a bearing on the disruptive effect on the radio wave transmission or anomaly therein. Therefore, the effects obtained in actual practice may be expected to vary somewhat from the predicted values in the preceding example.

Figure 3:
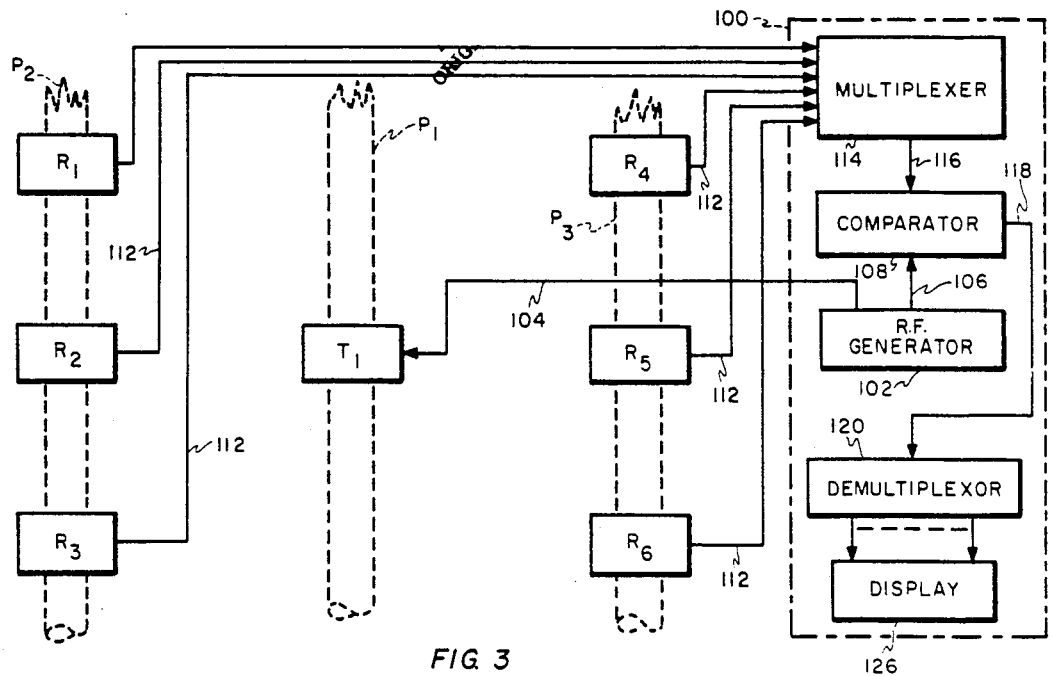
FIG. 3 is a diagrammatic illustration of a modified system embodying the invention.

Referring now to FIG. 3, there will be described a manner in which the invention may be utilized to monitor a considerable area or volume of water, and to determine the location of an anomaly producing object such as a swimmer with respect to a bridge, pier, or the like, having a large number of pilings or supports. In this embodiment, a single electromagnetic energy radiating or transmitting device T1 is used in cooperation with a plurality of receiving devices R1, R2,...R6. Also, in this embodiment is illustrated the use of a radio frequency generator as a reference frequency and phase source rather than a broadcast transmitter such as transmitter 12 of the previous example. Thus, at a suitable remote monitoring station 100, a radio frequency generator 102 is provided that is connected as shown by line 104 to the underwater transmitter T1 on a piling P1. Radio frequency generator 102 is further connected, as shown by line 106 to a phase comparator 108.

Receivers R1, R2,...R6 are mounted under water in a predetermined pattern or array on pilings P2 and P3. Outputs from the respective receivers are connected as shown by lines 112 to multiplexing means 114 for conversion to a convenient input via line 116 to comparator 108. The output of comparator 108, on line 118, is applied to a demultiplexer means 120. Demultiplexer means 120 provides outputs on lines 122, representative of phase relations between the reference signal from generator 102 and the received signals from receivers R1, R2,...R6, to display means 126. Display means 126 conveniently comprises a plurality of indicators referenced to respective ones of the plurality of receivers, whereby the occasion of introduction of an anomaly in the transmission through the water can be readily noted and its location within the array identified.

Other means of identifying location through use of the invention may include the use of arrays such as shown in FIG. 3, each array having a somewhat different characteristic frequency or, using the same frequency the received signals from the individual receivers may be chopped at predetermined distinguishing frequencies different than the radio frequency being used.

Figure 4:
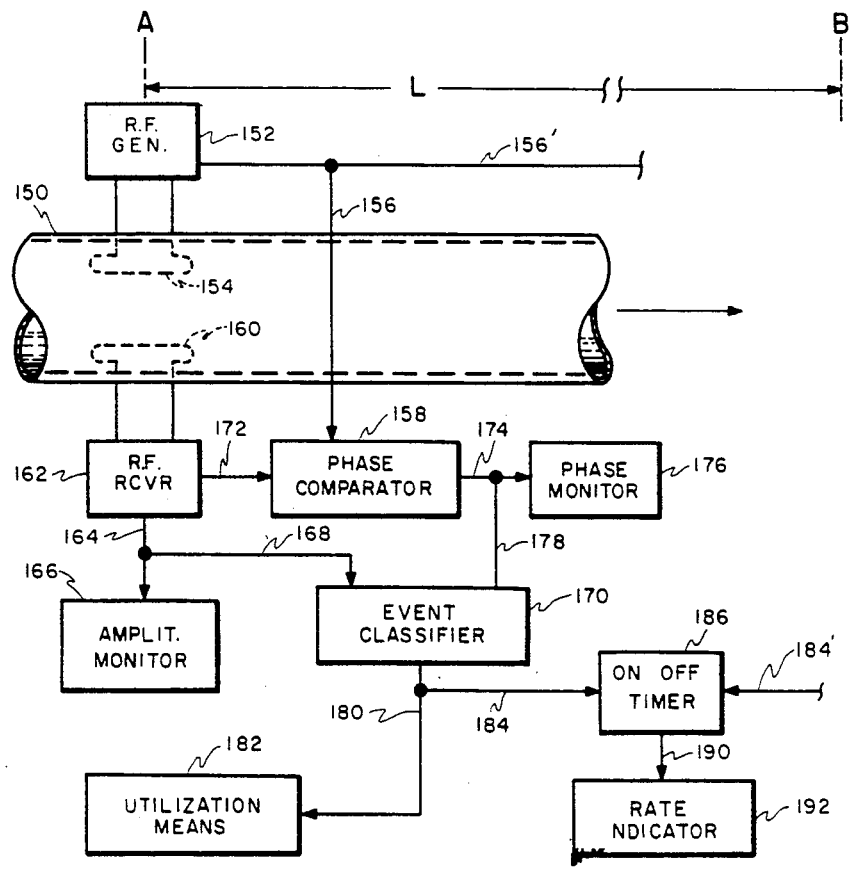
FIG. 4 is a diagrammatic illustration of another application of the invention.

Referring now to FIG. 4, an application of the invention to monitoring flow of materials through a conduit 150 will be described. In plants using chemical processes it is desired at times to have liquids of different characters following one another in a given conduit, and it becomes necessary to detect when the boundary between such liquids passes a predetermined location. The invention provides a convenient means for doing so when the liquids are characterized by different radio wave transmissive capabilities.

As an example, a radio frequency generator 152 supplies radio frequency electromagnetic energy to an antenna 154 within conduit 150, and also applies a corresponding radio frequency signal via line 156 as a reference to a phase comparator 158. Opposite the antenna 154, and also within conduit 150, is a receiving antenna 160 that is connected to a radio frequency receiver 162. Receiver 162 provides an output via line 164 to an amplitude monitor 166 and via line 168 to an event classifier 170. Receiver 162 also applies a signal corresponding to the received frequency via line 172 as a second input to phase comparator 158. Comparator 158 provides an output on line 174 that is representative of changes in phase differences between the signals received respectively via lines 156 and 172. The signal on line 174 is applied to a phase monitor 176 and, via line 178, has a second input to the event classifier 170.

Classifier 170, which may conveniently comprise coincident gate means for producing an output when predetermined changes in amplitude and phase occur simultaneously, provides an output on line 180 to utilization means 182. Utilization means 182 may comprise an indicator, recorder, or control device for modifying the flow of material through conduit 150.

By using a plurality of systems such as that just described, rate of flow through conduit 150 may be readily obtained. Thus, with a first system at point A with respect to conduit 150, and a second system spaced a predetermined distance L along the conduit at point B, the time required for travel of the matter in conduit 150 from point A to B can be readily determined. Thus, the output from classifier 170 may be applied via line 184 to a timer means 186, while the output from the classifier associated with the system at point B may be applied via line 184' to that timer. By having the output on line 184 initiate a timing sequence and the output on line 184' terminating a timing sequence, it will be appreciated that for a given distance L the flow rate may be readily computed. This may be done automatically by providing a timer output signal via line 190 to a suitable rate indicator 192 or other utilization means.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. Apparatus for sensing an anomaly in a body of electrically conductive liquid, said apparatus comprising:

a first transmitter of first radio wave signals having a predetermined frequency, said first transmitter being operative to broadcast said first radio wave signals through the air adjacent said body of liquid;

a first receiving antenna at a predetermined first location for receiving said first radio wave signals through the air from said first transmitter;

a second transmitter, connected to said first receiving antenna, for transmitting into said liquid second radio wave signals having the same frequency and modulation as said first radio wave signals, said second radio wave signals being transmitted by said second transmitter with greater power than said first radio wave signals as received by said first receiving antenna, so as to be receivable through said liquid at a predetermined second location;

a second receiving antenna, at said second location, for receiving said first radio wave signals through the air from said first transmitter;

a third receiving antenna, at said second location, for receiving said second radio wave signals through said liquid from said second transmitter;

phase comparator means, coupled between said second and third receiving antennas, for comparing phases of said first and said second radio wave signals as received through said air and said liquid, respectively, and for generating therefrom phase difference representative signals; and phase monitor means, connected to said phase comparator means and responsive to said phase difference representative signals, for indicating changes in phase difference when an anomaly intrudes in a zone of said liquid between said first and second locations.

2. Apparatus as defined in claim 1, and wherein:
said body of electrically conductive liquid comprises an aqueous medium;
said first transmitter comprises a first transmitting antenna disposed above said aqueous medium;
said second transmitter comprises a second transmitting antenna immersed in said aqueous medium; and
said third receiving antenna is immersed in said aqueous medium.

3. Apparatus as defined in claim 2, and further comprising:
coincidence gate means, connected to be responsive to coincidence of said phase difference representing signals and to predetermined levels of amplitude of signal strength in said second radio wave signals as received by said third receiving antenna, for providing alarm signals; and
means, responsive to said alarm signals, for providing an alarm indication upon intrusion of an anomaly into said zone.

4. Apparatus as defined in claim 3 and wherein:
said first transmitter comprises an amplitude modulation broadcast transmitter;
said first radio wave signals comprises an amplitude modulated carrier wave of said predetermined frequency; and
said second radio wave signals comprise an amplitude modulated carrier wave of said predetermined frequency and modulated in accordance with said first radio wave signals.

* * * * *